(12) United States Patent
Gimblet et al.

(10) Patent No.: US 8,909,014 B2
(45) Date of Patent: Dec. 9, 2014

(54) FIBER OPTIC CABLE WITH ACCESS FEATURES AND JACKET-TO-CORE COUPLING, AND METHODS OF MAKING THE SAME

(75) Inventors: Michael J. Gimblet, Conover, NC (US); Julian L. Greenwood, III, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 193 days.

(21) Appl. No.: 13/489,901

(22) Filed: Jun. 6, 2012

(65) Prior Publication Data

US 2013/0287346 A1   Oct. 31, 2013

Related U.S. Application Data

(60) Provisional application No. 61/639,411, filed on Apr. 27, 2012.

(51) Int. Cl.
  *G02B 6/44* (2006.01)
  *B28B 11/16* (2006.01)

(52) U.S. Cl.
  USPC ........... 385/113; 385/109; 385/110; 385/111; 264/1.29; 264/165

(58) Field of Classification Search
  USPC ........ 385/100–113; 427/163.2; 428/364–401; 264/1.29, 165
  See application file for complete search history.

(56) References Cited

U.S. PATENT DOCUMENTS

| | | | |
|---|---|---|---|
| 3,076,235 A | 2/1963 | Rollins et al. | |
| 3,991,014 A | 11/1976 | Kleinschuster | 260/47 |
| 4,067,852 A | 1/1978 | Calundann | 260/47 |
| 4,083,829 A | 4/1978 | Calundann et al. | 260/47 |
| 4,130,545 A | 12/1978 | Calundann | 260/40 P |
| 4,237,337 A | 12/1980 | Serrander | 174/70 R |

(Continued)

FOREIGN PATENT DOCUMENTS

| | | | | |
|---|---|---|---|---|
| DE | 4421456 A1 | 12/1995 | | B29C 47/02 |
| EP | 647866 A1 | 4/1995 | | G02B 6/44 |

(Continued)

OTHER PUBLICATIONS

U.S. Appl. No. 13/445,517, filed Apr. 12, 2012, Eric R. Logan, 29 pages.

(Continued)

*Primary Examiner* — Akm Enayet Ullah
*Assistant Examiner* — Michael Mooney (57) ABSTRACT

A fiber optic cable includes a cable jacket and a core. The cable jacket is tubular, having exterior and interior surfaces, and is formed mostly from a first polymeric material. The jacket includes access features formed from a second polymeric material at least partially embedded in the first polymeric material and extending lengthwise along the jacket. Two of the access features are spaced apart from one another with a section of the jacket formed from the first polymeric material extending laterally therebetween, such that the section may be peeled apart from the rest of the cable lengthwise along the jacket by separation of the jacket about the access features. The core has an outermost surface and includes optical fibers and a strength member. The outermost surface of the core is at least partially bonded to the interior surface of the jacket, which enhances coupling between the jacket and core.

20 Claims, 6 Drawing Sheets

(56) References Cited

U.S. PATENT DOCUMENTS

| | | | |
|---|---|---|---|
| 4,248,824 A | 2/1981 | Hattop | 264/171 |
| 4,318,842 A | 3/1982 | East et al. | 524/605 |
| 4,456,331 A | 6/1984 | Whitehead et al. | 350/96.23 |
| 4,468,364 A | 8/1984 | Ide | 264/176 R |
| 4,707,074 A | 11/1987 | Heywood | 350/96.23 |
| 4,729,628 A | 3/1988 | Kraft et al. | 350/96.23 |
| 4,848,868 A | 7/1989 | Rohner | 350/96.23 |
| 5,218,659 A | 6/1993 | Schneider | 385/110 |
| 5,360,497 A | 11/1994 | Schneider et al. | 156/47 |
| 5,442,722 A | 8/1995 | DeCarlo | 385/114 |
| 5,636,308 A | 6/1997 | Personne et al. | 385/102 |
| 5,651,081 A | 7/1997 | Blew et al. | 385/101 |
| 5,717,805 A | 2/1998 | Stulpin | 385/114 |
| 5,737,470 A | 4/1998 | Nagano et al. | 385/114 |
| 5,970,196 A | 10/1999 | Greveling et al. | 385/114 |
| 5,987,204 A | 11/1999 | Lee et al. | 385/100 |
| 6,041,153 A | 3/2000 | Yang | 385/109 |
| 6,088,499 A | 7/2000 | Newton et al. | 385/112 |
| 6,137,936 A | 10/2000 | Fitz et al. | 385/113 |
| 6,167,180 A | 12/2000 | Keller | 385/113 |
| 6,222,969 B1 | 4/2001 | Botelho et al. | 385/114 |
| 6,311,000 B1 | 10/2001 | Schneider | 385/113 |
| 6,351,589 B1 | 2/2002 | Leggett | 385/128 |
| 6,404,962 B1 | 6/2002 | Hardwick, III et al. | 385/114 |
| 6,519,396 B2 | 2/2003 | Schneider et al. | 385/101 |
| 6,542,674 B1 | 4/2003 | Gimblet | 385/113 |
| 6,545,222 B2 | 4/2003 | Yokokawa et al. | 174/110 R |
| 6,546,176 B2 | 4/2003 | Anderson et al. | 385/113 |
| 6,563,991 B1 | 5/2003 | Witt et al. | 385/107 |
| 6,603,908 B2 | 8/2003 | Dallas et al. | 385/109 |
| 6,661,956 B2 | 12/2003 | Yamasaki et al. | 385/109 |
| 6,704,481 B2 | 3/2004 | Gaillard et al. | 385/113 |
| 6,728,455 B2 | 4/2004 | Kusakari et al. | 385/113 |
| 6,760,522 B2 | 7/2004 | Okada et al. | 385/109 |
| 6,766,091 B2 | 7/2004 | Beuth et al. | 385/128 |
| 6,813,421 B2 | 11/2004 | Lail et al. | 385/113 |
| 6,876,798 B2 | 4/2005 | Triplett et al. | 385/100 |
| 6,957,000 B2 | 10/2005 | McAlpine et al. | 385/102 |
| 7,029,137 B2 | 4/2006 | Lionetti et al. | 362/84 |
| 7,050,685 B2 | 5/2006 | Plemmons et al. | 385/109 |
| 7,085,459 B2 | 8/2006 | Conrad et al. | 385/114 |
| 7,116,872 B2 | 10/2006 | Okuno et al. | 385/114 |
| 7,123,801 B2 | 10/2006 | Fitz | 385/105 |
| 7,136,556 B2 | 11/2006 | Brown et al. | 385/102 |
| 7,187,830 B2 | 3/2007 | Blazer | 385/114 |
| 7,197,215 B2 | 3/2007 | Baird et al. | 385/113 |
| 7,218,821 B2 | 5/2007 | Bocanegra et al. | 385/103 |
| 7,225,534 B2 | 6/2007 | Kachmar | 29/825 |
| 7,251,411 B1 | 7/2007 | Lu et al. | 385/147 |
| 7,346,244 B2 | 3/2008 | Gowan et al. | 385/113 |
| 7,379,642 B2 | 5/2008 | Kachmar | 385/102 |
| 7,391,943 B2 | 6/2008 | Blazer et al. | 385/100 |
| 7,400,810 B2 | 7/2008 | Tanaka et al. | 385/134 |
| 7,403,685 B2 | 7/2008 | Wells | 385/100 |
| 7,415,181 B2 | 8/2008 | Greenwood et al. | 385/100 |
| 7,424,189 B2 | 9/2008 | Lu et al. | 385/100 |
| 7,471,862 B2 | 12/2008 | Bringuier et al. | 385/113 |
| 7,480,436 B2 | 1/2009 | Wells et al. | 385/134 |
| 7,489,843 B2 | 2/2009 | Carlson et al. | 385/114 |
| 7,532,796 B2 | 5/2009 | Chiasson | 385/114 |
| 7,539,380 B1 | 5/2009 | Abernathy et al. | 385/100 |
| 7,567,741 B2 | 7/2009 | Abernathy et al. | 385/113 |
| 7,587,111 B2 | 9/2009 | de Montmorillon et al. | 385/127 |
| 7,590,321 B2 | 9/2009 | Lu et al. | 385/104 |
| 7,603,012 B1 | 10/2009 | Ice | 385/103 |
| 7,623,747 B2 | 11/2009 | De Montmorillon et al. | 385/124 |
| 7,693,375 B2 | 4/2010 | Freeland et al. | 385/100 |
| 7,787,727 B2 | 8/2010 | Bringuier et al. | 385/113 |
| 7,796,853 B2 | 9/2010 | Abernathy et al. | 385/100 |
| 7,817,891 B2 | 10/2010 | Lavenne et al. | 385/109 |
| 2003/0118295 A1 | 6/2003 | Lail et al. | 385/101 |
| 2006/0045443 A1 | 3/2006 | Blazer | 385/114 |
| 2006/0127016 A1 | 6/2006 | Baird et al. | 385/113 |
| 2006/0291787 A1 | 12/2006 | Seddon | 385/113 |
| 2008/0013899 A1 | 1/2008 | Gowan et al. | 385/113 |
| 2008/0193092 A1 | 8/2008 | Greenwood et al. | 385/113 |
| 2009/0087148 A1 | 4/2009 | Bradley et al. | 385/76 |
| 2009/0274425 A1 | 11/2009 | Caldwell et al. | 385/102 |
| 2009/0274426 A1 | 11/2009 | Lail | 385/105 |
| 2009/0317039 A1 | 12/2009 | Blazer et al. | 385/107 |
| 2009/0324182 A1 | 12/2009 | Kachmar et al. | 385/104 |
| 2010/0132973 A1 | 6/2010 | Fitz et al. | 174/102 R |
| 2011/0217010 A1* | 9/2011 | Kachmar | 385/111 |
| 2011/0229098 A1 | 9/2011 | Abernathy et al. | 385/102 |

FOREIGN PATENT DOCUMENTS

| | | | |
|---|---|---|---|
| EP | 749129 A1 | 12/1996 | H01B 7/00 |
| EP | 1168024 B1 | 6/2006 | G02B 6/44 |
| EP | 1376156 B1 | 7/2006 | G02B 1/04 |
| JP | 60-91306 A | 5/1985 | G02B 6/24 |
| JP | 63-120206 U | 8/1988 | G02B 6/08 |
| JP | 9-230184 A | 9/1997 | G02B 6/44 |
| JP | 2005-148373 A | 6/2005 | G02B 6/44 |
| JP | 2005-345622 A | 12/2005 | G02B 6/44 |
| JP | 2006-162703 A | 6/2006 | G02B 6/44 |
| JP | 2006-171570 A | 6/2006 | G02B 6/44 |
| JP | 2006-251769 A | 9/2006 | G02B 6/44 |
| JP | 2006-251770 A | 9/2006 | G02B 6/44 |
| JP | 2006-267600 A | 10/2006 | G02B 6/44 |
| JP | 2007-272006 A | 10/2007 | G02B 6/44 |
| JP | 2009-37150 A | 2/2009 | G02B 6/44 |
| JP | 2009-258153 A | 11/2009 | G02B 6/44 |
| KR | 2006-0081266 | 7/2006 | G02B 6/44 |
| KR | 2006-0107414 | 10/2006 | G02B 6/02 |
| WO | 03/046074 A1 | 6/2003 | C08L 23/16 |
| WO | 2004/021367 A2 | 3/2004 | H01B 7/00 |
| WO | 2005/096053 A1 | 10/2005 | G02B 6/44 |
| WO | 2006/097540 A1 | 9/2006 | G02B 6/44 |
| WO | 2011/109498 A2 | 9/2011 | |
| WO | 2011/137236 A1 | 11/2011 | B29C 47/02 |
| WO | 2012/058181 A1 | 5/2012 | G02B 6/44 |
| WO | 2012/071490 A2 | 5/2012 | B29C 47/02 |

OTHER PUBLICATIONS

U.S. Appl. No. 13/489,901, filed Jun. 6, 2012, Michael J. Gimblet, 23 pages.

U.S. Appl. No. 13/560,374, filed Jul. 27, 2012, Michael John Gimblet, 24 pages.

U.S. Appl. No. 13/646,962, filed Oct. 8, 2012, Anne Germaine Bringuier, 26 pages.

U.S. Appl. No. 13/658,404, filed Oct. 23, 2012, Michael John Gimblet, 21 pages.

U.S. Appl. No. 13/658,431, filed Oct. 23, 2012, Samuel Don Nave, 19 pages.

Nippon Telegraph and Telephone Corporation, Specification for Aerial SM Optical Fiber Cable, Spec. No. 520292, 4th Version, Jul. 29, 2002, 56 pages.

Renka Corporation, Single Mode Optical Fiber Cable, Specification No. RENKA/OFC/SM-DI/AR, Dec. 2000, 13 pages.

PCT IPRP for Publication WO2011137236, Nov. 6, 2011, 10 pages.

PCT ISR for Publication WO2011137236, Aug. 9, 2011, 6 pages.

PCT ISR for Publication WO2012058181, Feb. 23, 2012, 4 pages.

PCT ISR for Publication WO2012071490, Sep. 12, 2012, 7 pages.

* cited by examiner

FIBER OPTIC CABLE WITH ACCESS FEATURES AND JACKET-TO-CORE COUPLING, AND METHODS OF MAKING THE SAME

PRIORITY CLAIM

This application claims the benefit of priority under 35 U.S.C. 119 of U.S. Provisional Application Ser. No. 61/639,411 filed on Apr. 27, 2012, the content of which is relied upon and incorporated herein by reference in its entirety.

RELATED APPLICATIONS

Subject matter disclosed in this Application relates to subject matter disclosed in International Application PCT/US11/62002 filed Nov. 23, 2011, and subject matter disclosed in U.S. Provisional Application 61/546,597 filed Oct. 13, 2011, each of which is incorporated by reference herein in its entirety.

BACKGROUND

Disclosure provided herein relates generally to the field of fiber optic cable. More specifically, disclosure provided herein relates to structure of fiber optic cable that provides fast access to the core of the cable through the jacket of the cable, while providing a generally robust fiber optic cable.

SUMMARY

One embodiment relates to a fiber optic cable, which includes a jacket and a core. The jacket is tubular, having exterior and interior surfaces, and is formed mostly from a first polymeric material. The jacket includes access features formed from a second polymeric material at least partially embedded in the first polymeric material and extending lengthwise along the jacket. Two of the access features are spaced apart from one another with a section of the jacket formed from the first polymeric material extending laterally therebetween, such that the section may be peeled apart from the rest of the cable lengthwise along the jacket by separation of the jacket about the access features. The core has an outermost surface and includes optical fibers and a strength member. The outermost surface of the core is at least partially bonded to the interior surface of the jacket, thereby enhancing coupling between the jacket and core.

Another embodiment relates to a fiber optic cable, which includes a jacket and a core. The is tubular, having exterior and interior surfaces, and is formed mostly from a first polymeric material. Furthermore, the jacket includes access features formed from a second polymeric material at least partially embedded in the first polymeric material and extending lengthwise along the jacket. The core includes optical fibers and a strength member, and has an outermost surface, where the outermost surface of the core is at least partially bonded to the interior surface of the jacket, thereby enhancing coupling between the jacket and core. Two of the access features are spaced apart from one another with a section of the jacket formed from the first polymeric material extending laterally therebetween such that the section may be peeled apart from the rest of the cable lengthwise along the jacket by separation of the jacket about the access features to provide access to the core. The average peel force for pulling the section of the jacket orthogonally from the rest of the cable, including the force to decouple the interior surface of the jacket bonded to the outermost surface of the core, is less than 120 N.

Yet another embodiment relates to a method of manufacturing a fiber optic cable. The method includes a step of extruding a jacket over a core. The core has an outermost surface, and includes optical fibers and a strength member. The jacket is tubular, having exterior and interior surfaces, and is formed mostly from a first polymeric material. The method further includes a step of co-extruding access features into the jacket, where the access features are formed from a second polymeric material at least partially embedded in the first polymeric material and extending lengthwise along the jacket. Two of the access features are spaced apart from one another with a section of the jacket formed from the first polymeric material extending laterally therebetween such that the section may be peeled apart from the rest of the cable lengthwise along the jacket by separation of the jacket about the access features to provide access to the core. The method further includes a step of bonding the interior of the jacket to the outermost surface of the core, thereby enhancing coupling between the jacket and core.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE FIGURES

The accompanying Figures are included to provide a further understanding, and are incorporated in and constitute a part of this specification. The drawings illustrate one or more embodiments, and together with the Detailed Description serve to explain principles and operations of the various embodiments. As such, the disclosure will become more fully understood from the following Detailed Description, taken in conjunction with the accompanying Figures, in which.

DETAILED DESCRIPTION

Before turning to the following Detailed Description and Figures, which illustrate exemplary embodiments in detail, it should be understood that the present invention is not limited to the details or methodology set forth in the Detailed Description or illustrated in the Figures. For example, as will be understood by those of ordinary skill in the art, features and attributes associated with embodiments shown in one of the Figures or described in the text relating to one of the embodiments may well be applied to other embodiments shown in another of the Figures or described elsewhere in the text.

Figure 1:
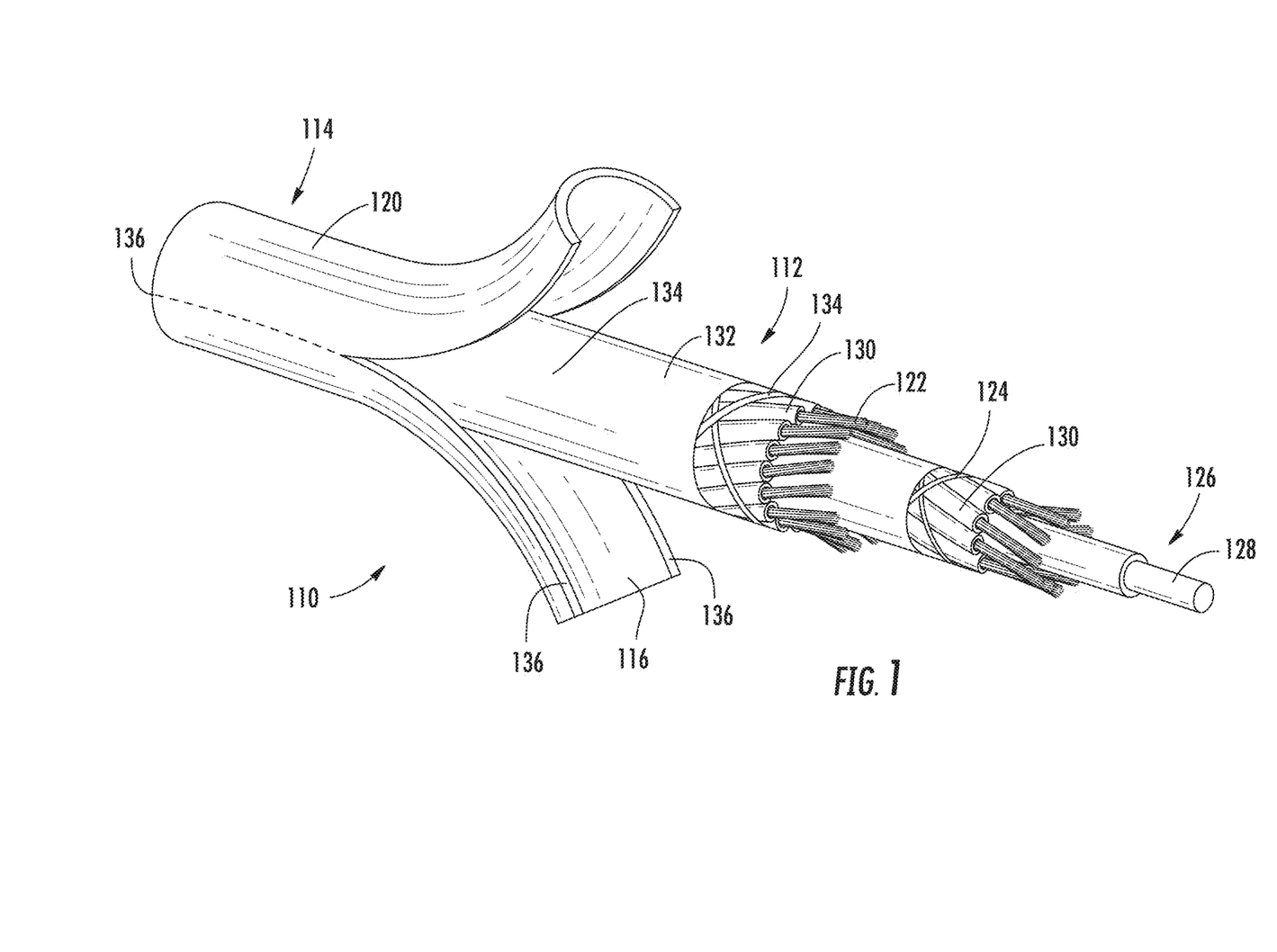
FIG. 1 is perspective view of fiber optic cable with the jacket peeling open along access features, and a core of the cable extending from the opened end, according to an exemplary embodiment.

Referring to FIG. 1 a fiber optic cable 110 includes a core 112 surrounded by a jacket 114. The jacket 114 has an exterior surface 120 and interior surface 116, which faces an outermost surface 118 of the core 112. The jacket 120 can be formed primarily from polymer materials, and can be generally referred to as "polymeric." In this specification, the terms "polymer" and "polymeric" indicate materials formed primarily of extrudable polymer materials such as, for example, copolymers, but allows for the presence of non-polymer materials such as additives and fillers. The core 112 may be, for example, an assembly or arrangement having data-transmission and/or power-transmission capabilities. In the illustrated embodiment of FIG. 1, the core 112 includes a bundle of optical fibers 122 bundled within contra-helically wound binders 124, the optical fibers 122 being capable of conveying data.

According to an exemplary embodiment, the fiber optic cable 110 includes a central strength member 126, which includes a glass-reinforced plastic rod 128 (or alternatively, stranded steel, aramid fibers, or other strength components). The bundles (e.g., buffer tube 130) of optical fibers 122 are stranded about the central strength member 126. In some embodiments, the fiber optic cable 110 includes multiple layers of stranded buffer tubes 130, which contain the optical fibers 122. According to an exemplary embodiment, the outermost layer of the core 112 of the fiber optic cable includes a water-swellable tape, such as water-swellable tape 132, and may additionally or otherwise include a binder yarn, such as binder yarn 134. The water-swellable tape 132 may be in the form of a flat sheet, a thinner yarn or ribbon, or may include another tape structure that supports a water-absorbing media, such as super-absorbent powder. Likewise, the binder yarn 134 may be in the form of a thin string, a net, or another yarn structure. In other embodiments, the cable may not include a central strength member, and the optical fibers may be arranged in ribbons or tight-buffered arrangements, or other configurations, which may or may not include buffer tubes. In still other embodiments, the cable may include copper or aluminum conductors in place of or in combination with optical fibers.

According to an exemplary embodiment, an adhesive (e.g., glue), such as a hot-melt adhesive (e.g., ethylene-vinyl acetate type hot-melt adhesive) may be integrated with the water-swellable tape 132 and/or the binder yarn 134 on the outermost surface of the core 112. In some embodiments, the adhesive is coated on the tape 132 and yarn 134. The adhesive may be coated on individual fibers of the tape 132 and/or yarn 134, or may be coated on complete structure. The adhesive may cover at least 50% of the surface of the tape 132 and/or yarn 134. In other embodiment, the adhesive is otherwise integrated with the tape 132 and yarn 134 (e.g., infused by soaking or dipping).

Still referring to FIG. 1, the jacket 114 includes an access feature 136 (e.g., separation feature, discontinuity of material) that facilitates access to the core 112. In the exemplary embodiment of FIG. 1, the access features 136 include a pair of extruded discontinuities of material (e.g., different material composition than adjacent jacket material) that extend along the length of the cable 110. Put another way, in some embodiments, the discontinuity is a portion of the jacket 114 of different material composition than the main portion of the jacket 114 (e.g., the majority of material forming the jacket, and associated structure). As shown in FIG. 1, the main portion of the jacket 114 is essentially be an annular hoop in cross section (i.e., tubular) surrounding the core 112, with the access features 136 extending longitudinally through the jacket 114 along a selected length of the cable 110. According to one aspect, the access feature 136 provide weakened tear lines that allow the jacket 114 to be separated as shown in FIG. 1. The illustrated access features 136 extend along the entire cable 110 length; although shorter lengths, such as 20 cm or more, may be used to provide access to the core 112.

Figure 2:
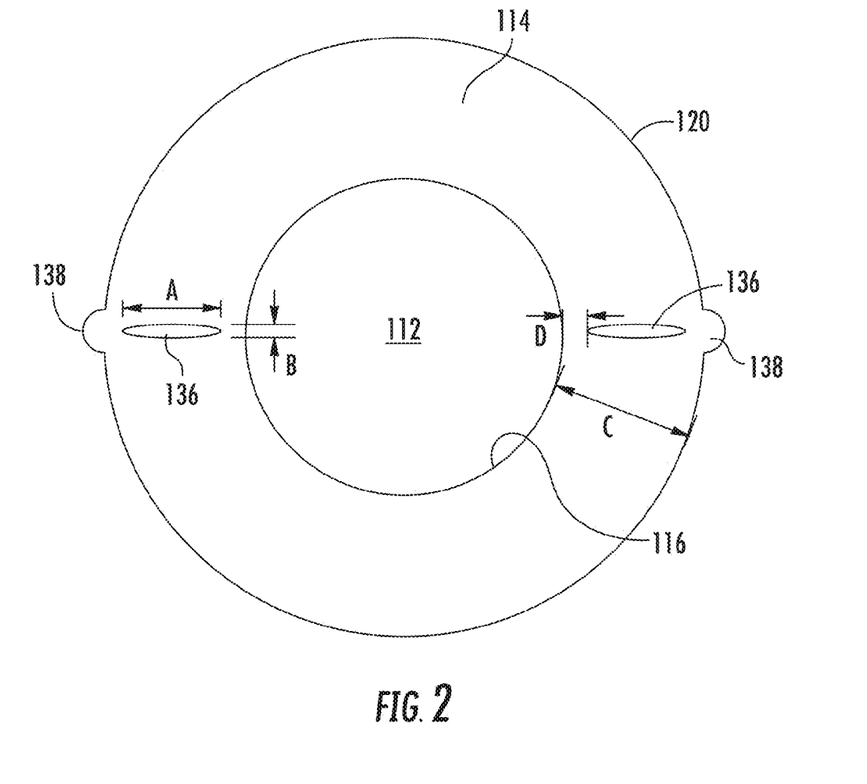
FIG. 2 is an end view of a jacket of a fiber optic cable, such as the fiber optic cable of FIG. 1, according to an exemplary embodiment.

Referring now to FIG. 2, a cross-section of the jacket 114, on a plane orthogonal to the length of the cable 110, includes the access features 136 coupled to the main portion of the jacket 114 (e.g., integrated with the rest of the jacket 114 via co-extrusion). While illustrated access features 136 are wholly embedded in the jacket 114, one or both ends of the access features 136 may extend to either jacket surface 116, 120. The jacket 114 may be formed from extrudable polymers, so that as the extrudates used to form the main portion (e.g., first polymeric material) and the discontinuities (e.g., second polymeric material) cool and solidify, the extrudates become coupled to a desired degree at the interface therebetween. When the access features 136 are formed while extruding the jacket 114, the coupling between discontinuity and surrounding material of the jacket 114 may be generally described as enabled by polymer chain entanglement as the jacket 114 solidifies. The jacket 114 accordingly includes a cohesive composite polymer structure. Using a discontinuity of coupled materials to form the access features 136 within the jacket 114 provides water blocking and allows control of the shape of the extruded cable 110, in addition to providing fast access capabilities to reach the core for splicing or other purposes.

According to an exemplary embodiment, the cable jacket 114 can also include tactile locator features, such as raised surfaces 138 or 'bumps'; depressed surfaces, such as 'divots' or channels; or other features that provide a tactile indication of the location of the underlying discontinuities of material within the jacket 114. A visual indication such as a stripe may also or alternatively be extruded or printed over the location of the access features 136 so that their locations are apparent from the cable exterior, if such features do not extend to the exterior surface 120 and/or are difficult to distinguish from the rest of jacket 114. Tactile or visual locator features may extend along the entire length of the cable 110, or along selected lengths.

Of the jacket 114, the access features 136 may be strips that each occupy up to, for example, 5% of the total jacket cross-sectional area (see FIG. 2). In exemplary embodiments, the access features 136 may be relatively narrow strips, and may occupy relatively small portions of the jacket cross-sectional area. For example, the access features 136 may have cross-sectional areas that are less than 3% of the total jacket cross-sectional area. In the illustrated embodiment, the access features 136 each have cross-sectional areas that are less than 2% of the total jacket cross-sectional area.

Figure 3:
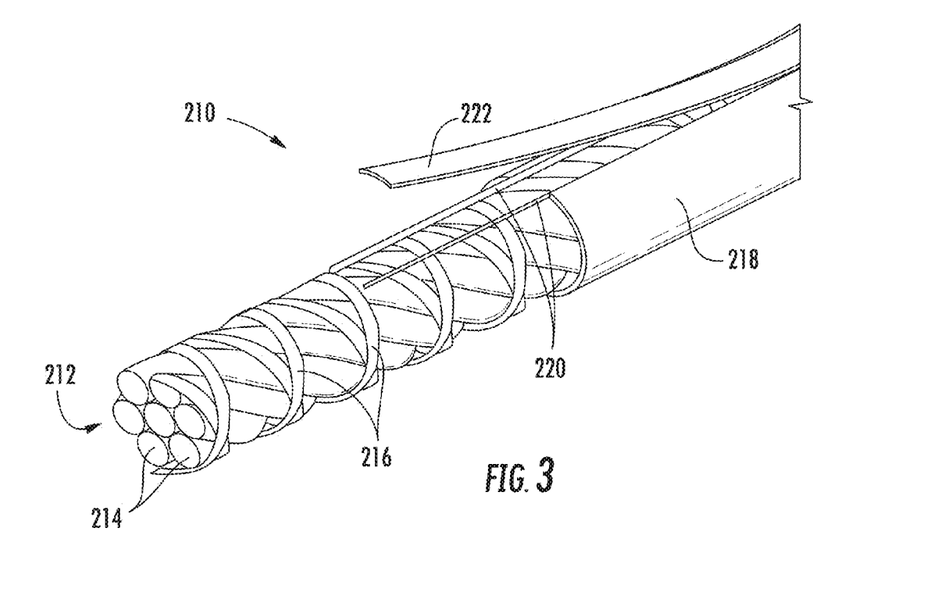
FIG. 3 is a perspective view of a fiber optic cable according to another exemplary embodiment.

Referring to FIG. 3, a cable 210 includes core 212 having stranded elements 214 (e.g., optical fibers, buffer tubes, copper wires) bound by a binder 216. The binder 216 includes an adhesive integrated therewith, which forms at least an outermost portion of the core 212. A jacket 218 surround the core 212 and includes access features 220 that facilitate peeling of a section 222 of the jacket 218 open, where the section 222 is between the access features 220. According to an exemplary embodiment, the jacket 218 is bonded (e.g., adhered, fastened) to the outermost portion of the core 212; more specifically, the jacket 218 is bonded to the binder 216 (and/or water-swellable tape) via the adhesive, which provides improved structural stability or ruggedness of the cable 210 prior to opening the cable 210 via the access features 220.

In FIGS. 1-3, two access features 136, 220 are formed in the respective jacket 114, 218 to facilitate opening of the jacket 114, 218. Depending on the form that the core 112, 212 (or another form) takes, the number, spacing, shape, composition, and other aspects of the access features 136, 220 may be varied. For example, a single discontinuity of material in the jacket 114 may be sufficient to allow the cable jacket 114 to be peeled away from the core 112.

Referring to FIG. 2, the discontinuity of material (e.g., second polymeric material) serving as the access feature 136 may have a maximum width A (e.g., a lateral distance from the center of the cable), a height B (e.g., a distance generally tangential to the annulus of the jacket 114), and a center spacing from the jacket interior surface 116 of D, with the jacket thickness being C. According to one aspect, the aspect ratio A:B is in the range of 1:4 to 1:100. In general, lower aspect ratios A:B, corresponding to narrower discontinuities, are favorable in cable cross-sections as shown in FIG. 2. It is these discontinuities that allow for a stress concentration to develop at the root (e.g., vertex, end) of a discontinuity and thus initiate tearing or fracture of the first polymeric material. In other embodiments, access features may be round, diamond-shaped, square, T-shaped, or otherwise shaped.

According to an exemplary embodiment, illustrated ratio B:C is about 1:2, which indicates that the height B of a discontinuity is about half of the jacket thickness C. The ratio B:C is selected to provide ease of access to the core 112 and to maintain sufficient robustness of the cable 110, and may vary with factors such as the fracture toughness of the first polymeric material, the bond between the discontinuities and the rest of the jacket 114 (e.g., first and second polymeric material bonding), and other factors. According to one embodiment, the ratio B:C is at least 1:4; or, stated alternatively, the discontinuity height B is at least a quarter of the jacket thickness C at the centerline of the cable. If an extremely thin, "film" type embodiment of access feature 136 is included, the maximum width B of a discontinuity may be in the range of 0.2 mm or less, and may be about 0.1 mm.

According to an exemplary embodiment, the materials and processes used to form the jacket 114, including the access features 136, may be selected so that the interfaces therebetween allow for relatively easy access to the core 112 by peeling back the jacket 114 as shown in FIG. 1. At least in part due to bonding between the core 112 and jacket 114, the cable 110 may be constructed to meet other requirements for robustness, such as requirements for the jacket 114 to stay intact under tensile loads, twisting, in temperature variations, and when subjected to other known cable test criteria, such as, for example, ICEA 460, and GR20.

The cable jacket 114, including the access features 136, described in this specification may be made from various polymer materials. The jacket 114 may be mostly formed from a first polymeric material, while the access features 136 may be formed from a second polymeric material. Either polymeric material may include or consist of polypropylene (PP), polyethylene (PE), or blends of materials such as a blend of PE and ethylene vinyl acetate (EVA), flame-retardant (FR) material, such as FR polyethylene, FR polypropylene, polyvinyl chloride (PVC), or polyvinylidene fluoride (PVDF), filled materials such as polybutylene terephthalate (PBT), a polycarbonate and/or a PE material and/or EVA or other blends thereof having fillers like a chalk, talc, or the like, and other materials such as a UV-curable acrylates.

In some embodiments, the jacket 114 may be primarily extruded from a first extrudable polymeric material, including at least 80% of a first polymer, polyethylene, by weight; and the access features 136 may be extruded from a second extrudable polymeric material including at least 70% of a second polymer, polypropylene, by weight. In some embodiments, the second extrudable polymeric material additionally includes at least 0.5% of the first polymer, polyethylene, by weight. Higher amounts by weight of the first polymeric material may be included in the second polymeric material, such as at least 1.0%, or at least 2%.

Without being bound by theory, Applicants believe bonding between polypropylene and polyethylene may be caused by one or both of quantities of ethylene that are compounded in the polypropylene bonding with the polyethylene, and molecular entanglement between the polyethylene and polypropylene. According to this understanding, the amount of ethylene in the polypropylene extrudate can be increased to increase the bond between the material discontinuities and the remainder of the jacket 114. Furthermore, either the first or second polymeric material being polyethylene, may improve the performance of the access feature, because due to the bonding characteristics of polyethylene.

In one embodiment, the first polymeric extruded material is or includes a medium density polyethylene (MDPE). The access features 136 are made from a second, polypropylene/polyethylene blend of extruded material, the blend including from 6% to 20% polyethylene, with the remainder of the blend being primarily a polypropylene material. The first polymer material may be, for example, a unimodal or bimodal type polyethylene defined by its molecular weight distribution, with the lower molecular weight polymer chains increasing bond strength at the interface of the jacket and the access features 136 (through the process of promoting entanglements and co-crystallization).

Figure 4:
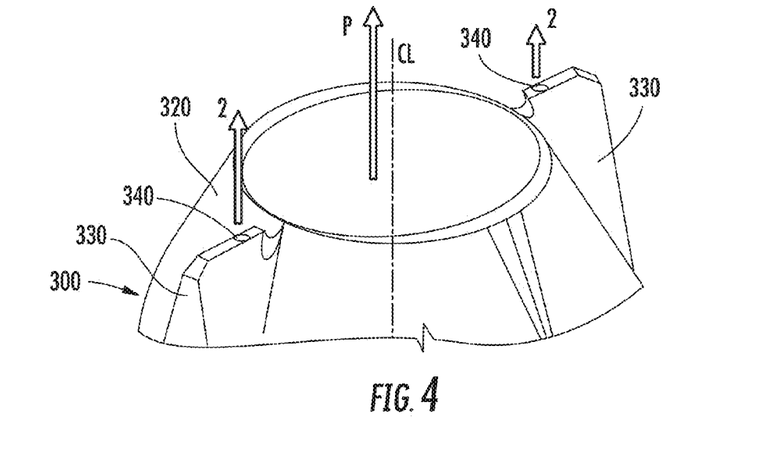
FIG. 4 is an extrusion flow diverter according to an exemplary embodiment.

FIG. 4 is a cutaway section view of a coextrusion flow diverter 300 that can be used in conjunction with an extrusion crosshead commonly used to form a tubular jacket such as the jacket 114 shown in FIG. 2. The flow diverter 300 can be a modification of an existing component of an extrusion apparatus. In such an extrusion apparatus, the extrusion tip and die are directly downstream of flow diverter 300. The arrows 2 in FIG. 4 illustrate the flow direction of molten extrudate. The flow diverter 300 has an exterior surface 320 over which flows the first molten extrudate material that is used to form the jacket 114. The diverter 300 includes a pair of struts or fins 330, each having a port 340 that allows introduction of the second molten extrudate material used to form the discontinuities (e.g., access features) into the flow of the first molten extrudate.

According to an exemplary embodiment, the flow diverter 300 acts to divide the first material around the ports 340 supplying the second material. The first and second extrudate materials join downstream of the flow diverter 300. As the first and second materials are extruded, a core 112 advances along the center line CL in the process direction P. The first and second extrudate materials draw down, cool, and solidify around the fiber optic core 112 advancing through the crosshead to form the cable 110. The tactile locator features 138 can be included by forming an exterior radius in the extrusion die. If desired, strength members, such as the strength members, can be introduced into the extrusion process and embedded in the jacket.

Figure 5:
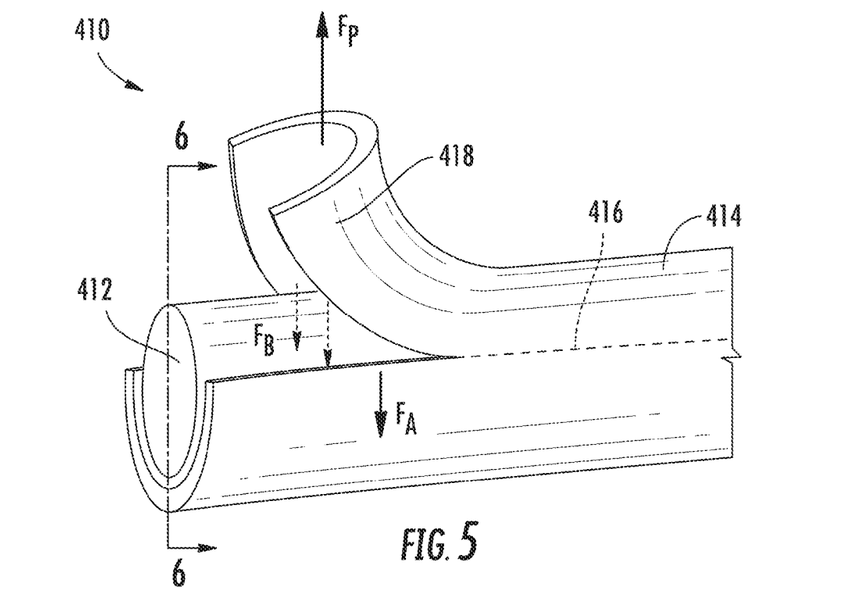
FIG. 5 is a conceptual diagram of a fiber optic cable that includes arrows representing opposing forces as the cable is opened using access features, according to an exemplary embodiment.
Figure 6:
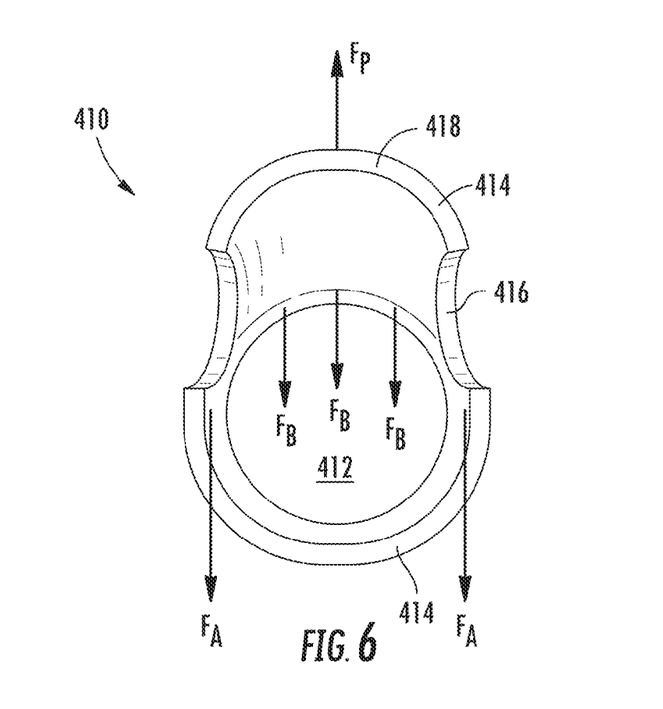
FIG. 6 is an end sectional view of the fiber optic cable of FIG. 5, taken along line 6-6 as shown in FIG. 5.

Referring now to FIGS. 5-6, one or more access features 416 in a cable jacket 414 can be arranged to provide relatively easy access to a core 412 of a cable 410. The ease of access can be defined, for example, by the force $F_P$ required to pull, or peel away a section 418 of the cable jacket 414 between two access features 416. The peel force $F_P$ can be measured as a direct force measurement, in Newtons, of the force a person must exert as the jacket section 418 is peeled away from the core 412. Such peeling must overcome the bonding forces $F_A$ between the access features and surround jacket material (as well as the adjoining jacket material to itself) and the bonding forces between the jacket 414 and the core 412 due to adhesives $F_B$, as may be integrated with the water-swellable tape, the binders, or other components on the outermost surface of the core 412.

It is understood that the jacket 414 may not be perfectly uniform, and that a person or machine may not exert a perfectly uniform force $F_P$ as the jacket 414 is peeled; so "peel forces" described in this specification indicate an average force exerted as a distance of the jacket section 418 is peeled back. It is also understood that peel forces $F_P$ according to the present embodiments are measured without any additional modifications to the cable jacket 414 exterior, such as by scoring. The peel forces $F_P$ can be relatively low when compared to the forces required to access a cable without access features 416. For example, a peel force $F_P$ may be less than about 150 Newtons (N), but may be at least 50 N, well within the tearing capabilities of a human operator. In exemplary embodiments, the peel force $F_P$ required may be from about 80 N to about 120 N. In contemplated embodiments, the peel force $F_P$ is less than 1000 N, less than 500 N, less than 300 N, less than 200 N, greater than 5 N, greater than 10 N, greater than 20 N, greater than 30 N, and/or any range combination thereof.

Figure 7:
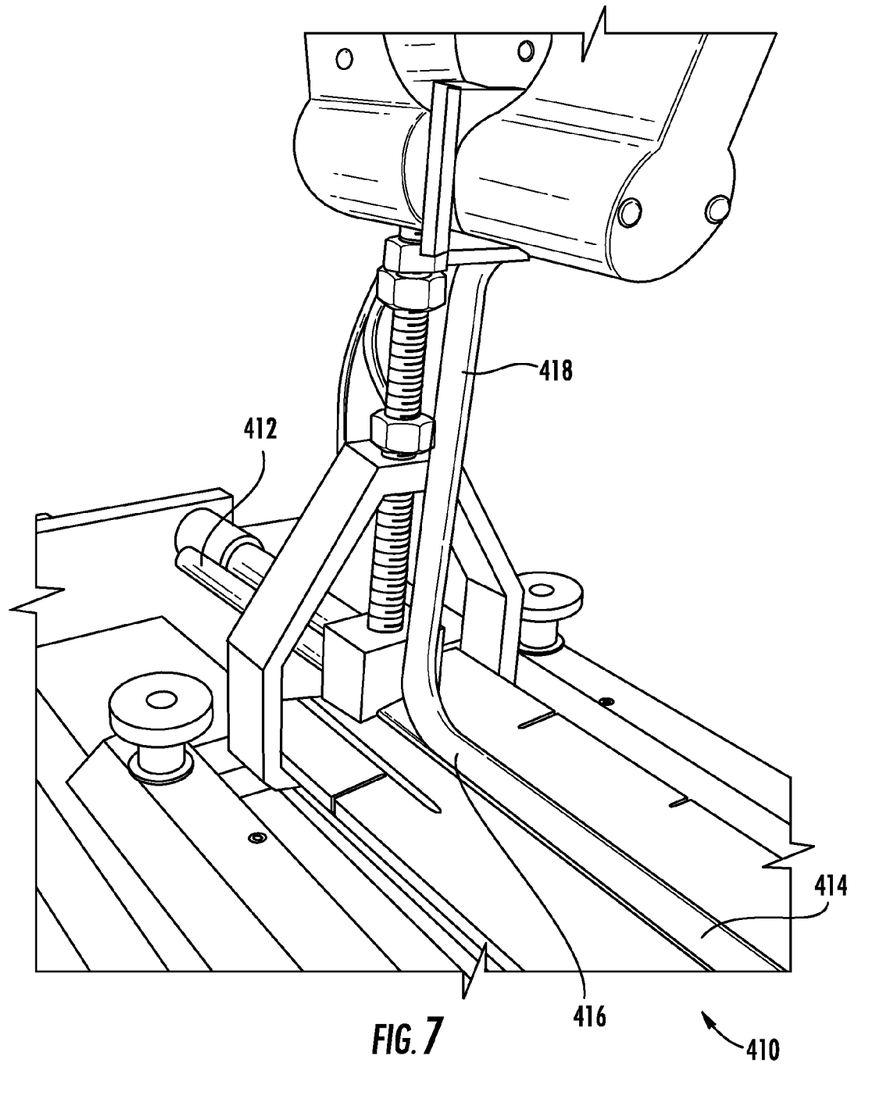
FIG. 7 is a digital image of a test setup for measuring the peel force required to access the core of a fiber optic cable, according to an exemplary embodiment.

Peel forces $F_P$ may be generally include any force great enough to cause the jacket 114 to rip, tear, or otherwise separate along the access features 416 for accessing the cable core. More specifically, a method of measuring peel force $F_P$, as used herein, includes a force testing machine, such as those available from Instron®, pulling the section 418 of cable 410 away from the remainder of the cable 410 at angle of 90-degrees to the remainder of the cable $F_P$. This machine is shown in FIG. 7. The cable 410 is secured to a linear slide that translates the cable 410 beneath the portion of the machine that is secured to the jacket section 414 being peeled away. In this arrangement, the cable 410 slides beneath the force gauge that measures tension on the section 414 being removed, so that the section 414 can be peeled away at a 90-degree angle. The tension in the section 414 can be averaged over a suitable distance (e.g., 10 cm) to obtain the average peel force.

Figure 8:
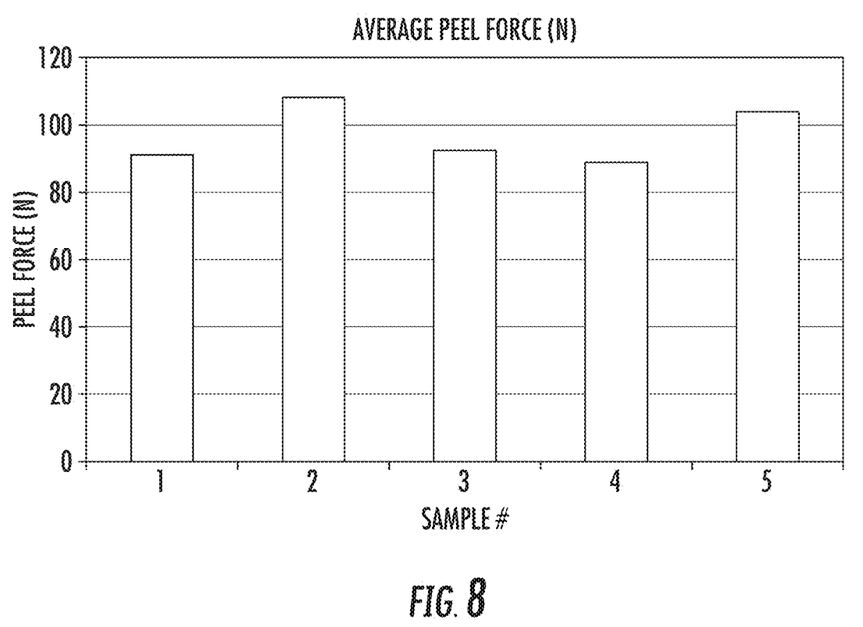
FIG. 8 is a graphical representation of average peel forces required to access the core of a fiber optic cable according to an exemplary embodiment.

FIG. 8 provides a graphical representation of average peel forces $F_P$ for a 24-position, central-strength-member, loose-tube fiber optic cable. The cable samples of the tests had a jacket thickness of 1.3 mm, with access features generally as shown in FIGS. 1-2. The cable included water-swellable tape with integrated hot-melt adhesive that was bonded to the interior surface of the jacket via the heat provided by the jacket immediately subsequent to extrusion. The first polymeric material of the jacket was primarily medium density polyethylene extruded at a temperature of 215-220 C (generally less than 250 C) and immediately cooled in a water trough at room temperature (e.g., 10 C). The second polymeric material forming the access features included a blend of primarily polypropylene and some polyethylene, as described herein. The line speed of the cable through the extruder was greater than 50 m/min, such as about 90 m/min.

In general, the separation properties disclosed in this specification may be obtained by co-extruding the discontinuities from a different material than the material used to form the main portion of the jacket. As an alternative method, the discontinuities may be made from the same material as the remainder of the jacket, but subjected to different curing conditions, for example.

The construction and arrangements of the fiber optic cable and access features, as shown in the various exemplary embodiments, are illustrative only. Although only a few embodiments have been described in detail in this disclosure, many modifications are possible (e.g., variations in sizes, dimensions, structures, shapes, and proportions of the various elements, values of parameters, mounting arrangements, use of materials, colors, orientations) without materially departing from the novel teachings and advantages of the subject matter described herein. For example, in contemplated embodiment, binders, water-blocking tape, or other components, forming at least a portion of the outermost surface of the core, bond to the interior surface of a cable jacket, where the cable jacket does not include access features, or where access features do not include embedded polymeric materials; where the bonding improves the structural stability of the associated cable. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A fiber optic cable, comprising:
    a jacket that is tubular, having exterior and interior surfaces,
        wherein the jacket is formed mostly from a first polymeric material,
        wherein the jacket comprises access features formed from a second polymeric material at least partially embedded in the first polymeric material and extending lengthwise along the jacket; and
        wherein two of the access features are spaced apart from one another with a section of the jacket formed from the first polymeric material extending laterally therebetween such that the section may be peeled apart from the rest of the cable lengthwise along the jacket by separation of the jacket about the access features; and
    a core having an outermost surface, the core comprising optical fibers and a strength member; wherein the outermost surface of the core is bonded to the interior surface of the jacket, thereby enhancing coupling between the jacket and core.

2. The fiber optic cable of claim 1, wherein the core further comprises a water-blocking tape, wherein the water-blocking tape forms at least a portion of the outermost surface of the core, and wherein the water-blocking tape is adhered to the interior surface of the jacket.

3. The fiber optic cable of claim 2, wherein the water-blocking tape includes a hot-melt adhesive integrated therewith, which bonds the core to the jacket.

4. The fiber optic cable of claim 3, wherein the hot-melt adhesive includes ethylene-vinyl acetate.

5. The fiber optic cable of claim 4, wherein the average peel force for pulling the section of the jacket orthogonally from the rest of the cable, including the force to decouple the interior surface of the jacket bonded to the outermost surface of the core, is less than 150 N.

6. The fiber optic cable of claim 5, wherein the average peel force for pulling the section of the jacket orthogonally from the rest of the cable is greater than 50 N.

7. The fiber optic cable of claim 4, wherein the average peel force for pulling the section of the jacket orthogonally from the rest of the cable, including the force to decouple the interior surface of the jacket bonded to the outermost surface of the core, is greater than 80 N.

8. The fiber optic cable of claim 7, wherein the average peel force for pulling the section of the jacket orthogonally from the rest of the cable is less than 120 N.

9. A fiber optic cable, comprising:
- a jacket that is tubular, having exterior and interior surfaces, wherein the jacket is formed mostly from a first polymeric material, wherein the jacket comprises access features formed from a second polymeric material at least partially embedded in the first polymeric material and extending lengthwise along the jacket; and
- a core comprising optical fibers and a strength member, wherein the core has an outermost surface, and wherein the outermost surface of the core is at least partially bonded to the interior surface of the jacket, thereby enhancing coupling between the jacket and core, and
- wherein two of the access features are spaced apart from one another with a section of the jacket formed from the first polymeric material extending laterally therebetween such that the section may be peeled apart from the rest of the cable lengthwise along the jacket by separation of the jacket about the access features to provide access to the core; and
- wherein the average peel force for pulling the section of the jacket orthogonally from the rest of the cable, including the force to decouple the interior surface of the jacket bonded to the outermost surface of the core, is less than 120 N.

10. The fiber optic cable of claim 9, wherein the access features are embedded in the jacket such that the access features are fully positioned between the interior and exterior surfaces of the jacket.

11. The fiber optic cable of claim 10, wherein the exterior surface of the jacket comprises access-location features adjacent to the access features to identify the location of the access features embedded in the jacket.

12. The fiber optic cable of claim 9, wherein the access features consist of the second polymeric material.

13. The fiber optic cable of claim 12, wherein the second polymeric material is a blend of materials that includes but is not limited to the first polymeric material.

14. The fiber optic cable of claim 13, wherein the first polymeric material comprises medium-density polyethylene.

15. A method of manufacturing a fiber optic cable, comprising steps of:
- extruding a jacket over a core having an outermost surface, the core comprising optical fibers and a strength member; wherein the jacket is tubular, having exterior and interior surfaces, and wherein the jacket is formed mostly from a first polymeric material,
- co-extruding access features into the jacket, wherein the access features are formed from a second polymeric material at least partially embedded in the first polymeric material and extending lengthwise along the jacket; and wherein two of the access features are spaced apart from one another with a section of the jacket formed from the first polymeric material extending laterally therebetween such that the section may be peeled apart from the rest of the cable lengthwise along the jacket by separation of the jacket about the access features to provide access to the core; and
- bonding the interior of the jacket to the outermost surface of the core, thereby enhancing coupling between the jacket and core.

16. The method of claim 15, wherein the bonding step includes contacting, during the extruding step, at least a portion of an outermost surface of the core with the interior of the jacket, while the first polymeric material has not fully cooled from the extruding step such that heat from the first polymeric material activates a hot-melt adhesive coupled to the outermost surface of the core, which provides the bonding.

17. The method of claim 16, wherein the core comprises water-swellable tape that forms at least a portion of the outermost surface of the core, and wherein the hot-melt adhesive is integrated with the water-swellable tape.

18. The method of claim 17, wherein the average peel force for pulling the section of the jacket orthogonally from the rest of the cable, including the force to decouple the interior surface of the jacket bonded to the outermost surface of the core, is less than 150 N.

19. The method of claim 18, wherein the average peel force for pulling the section of the jacket orthogonally from the rest of the cable, including the force to decouple the interior surface of the jacket bonded to the outermost surface of the core, is greater than 50 N.

20. The method of claim 19, wherein the average peel force for pulling the section of the jacket orthogonally from the rest of the cable is in the range of 80-120 N.

\* \* \* \* \*